US011312265B2

(12) United States Patent  
Liong et al.

(10) Patent No.: US 11,312,265 B2
(45) Date of Patent: Apr. 26, 2022

(54) SEATING ARRANGEMENT FOR VEHICLE

(71) Applicants: Iwan Liong, Bandung (ID); Azucena Pernia Martinez, Bandung (ID)

(72) Inventors: Iwan Liong, Bandung (ID); Azucena Pernia Martinez, Bandung (ID)

( * ) Notice: Subject to any disclaimer, the term of this patent is extended or adjusted under 35 U.S.C. 154(b) by 0 days.

(21) Appl. No.: 17/423,203

(22) PCT Filed: Aug. 29, 2019

(86) PCT No.: PCT/IB2019/057298
§ 371 (c)(1),
(2) Date: Jul. 15, 2021

(87) PCT Pub. No.: WO2020/152514
PCT Pub. Date: Jul. 30, 2020

(65) Prior Publication Data
US 2022/0041080 A1 Feb. 10, 2022

Related U.S. Application Data

(60) Provisional application No. 62/796,079, filed on Jan. 23, 2019.

(51) Int. Cl.
*B60N 2/01* (2006.01)
*B62D 61/02* (2006.01)
(Continued)

(52) U.S. Cl.
CPC ............. *B60N 2/012* (2013.01); *B60N 2/22* (2013.01); *B62D 31/003* (2013.01); *B62D 61/02* (2013.01)

(58) Field of Classification Search
CPC ........ B60N 2/012; B60N 2/22; B62D 31/003; B62D 61/02
(Continued)

(56) References Cited

U.S. PATENT DOCUMENTS 3,352,597 A * 11/1967 Barenyi .................. B60N 2/01
296/181.1
8,267,456 B2 9/2012 Murray
(Continued)

FOREIGN PATENT DOCUMENTS

CN 2367521 3/2000
CN 101190655 A 6/2008
(Continued)

OTHER PUBLICATIONS

International Preliminary Report on Patentability for Parent PCT application; dated May 24, 2021.
(Continued)

*Primary Examiner* — Hilary L Gutman
(74) *Attorney, Agent, or Firm* — Diament Patent Law, P.C.; Adam Diament

(57) ABSTRACT

A seating arrangement for a vehicle having a cabin space is provided. The seating arrangement includes a vehicle, at least one front seat within the vehicle, and at least one rear seat arranged behind the at least one front seat of the vehicle. The at least one front seat is rigidly fixed to and suspended from a portion of the vehicle, thereby providing a free space underneath the at least one front seat, such that an occupant of the vehicle seated in the at least one rear seat is able to position at least a lower portion of one or both legs thereof in the free space underneath the at least one front seat. A flexible covering, such as bristles may be attached to the periphery of the vehicle floor opening, so that a driver's foot can pass from inside the vehicle cabin, to the ground outside the vehicle.

1 Claim, 16 Drawing Sheets

(51) Int. Cl.
*B62D 31/00* (2006.01)
*B60N 2/22* (2006.01)

(58) Field of Classification Search
USPC .......................................... 296/64
See application file for complete search history.

(56) References Cited

U.S. PATENT DOCUMENTS

2012/0299327 A1   11/2012   Murray
2014/0152042 A1   6/2014    Woodhouse et al.

FOREIGN PATENT DOCUMENTS

| CN | 102582472 A | | 7/2012 | |
|---|---|---|---|---|
| CN | 207510191 U | | 6/2018 | |
| GB | 2254588 A | * | 10/1992 | ............... B60N 2/01 |
| GB | 2471364 A | * | 12/2010 | ............. B62D 25/00 |
| JP | 05058572 U | | 8/1993 | |
| JP | 2002104040 A | | 4/2002 | |
| JP | 2014104904 A | | 6/2014 | |

OTHER PUBLICATIONS

International Search Report from the parent PCT application; dated Feb. 4, 2020.
Written Opinion of the International Searching Authority of the parent PCT application; dated Feb. 4, 2020.

* cited by examiner

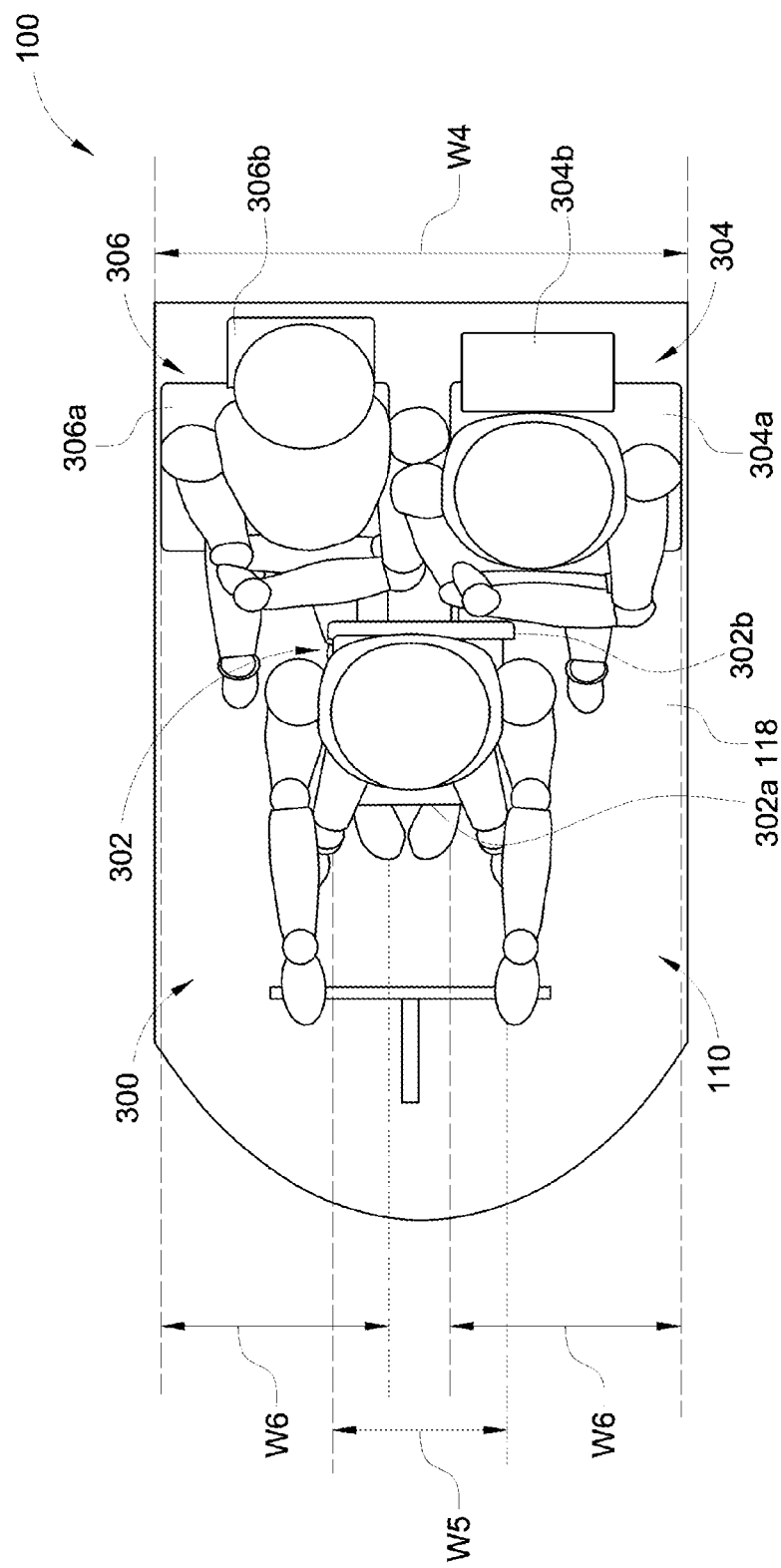

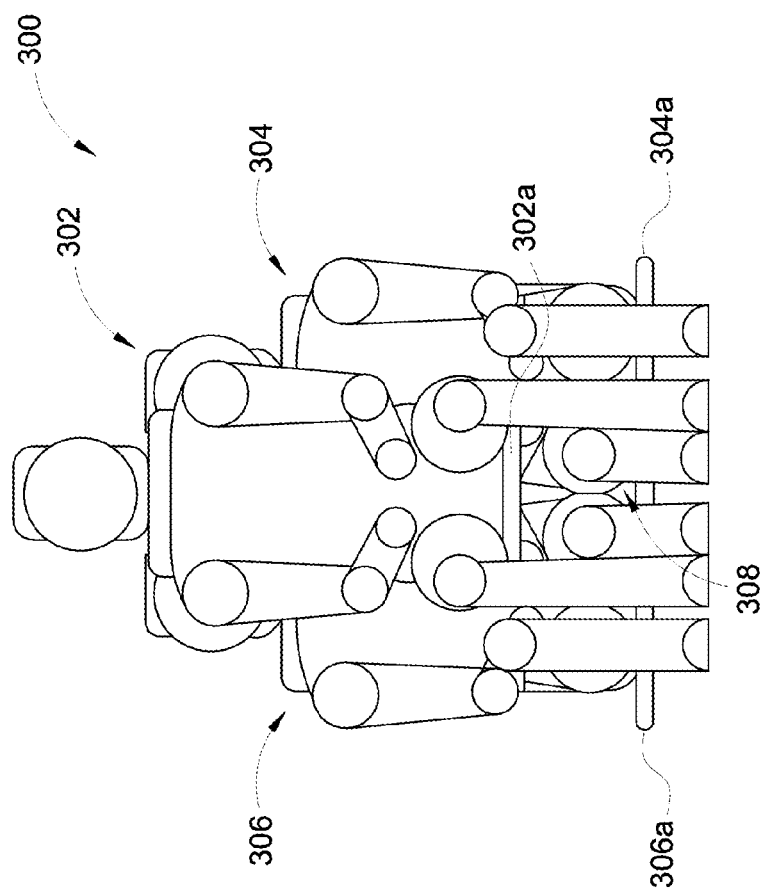

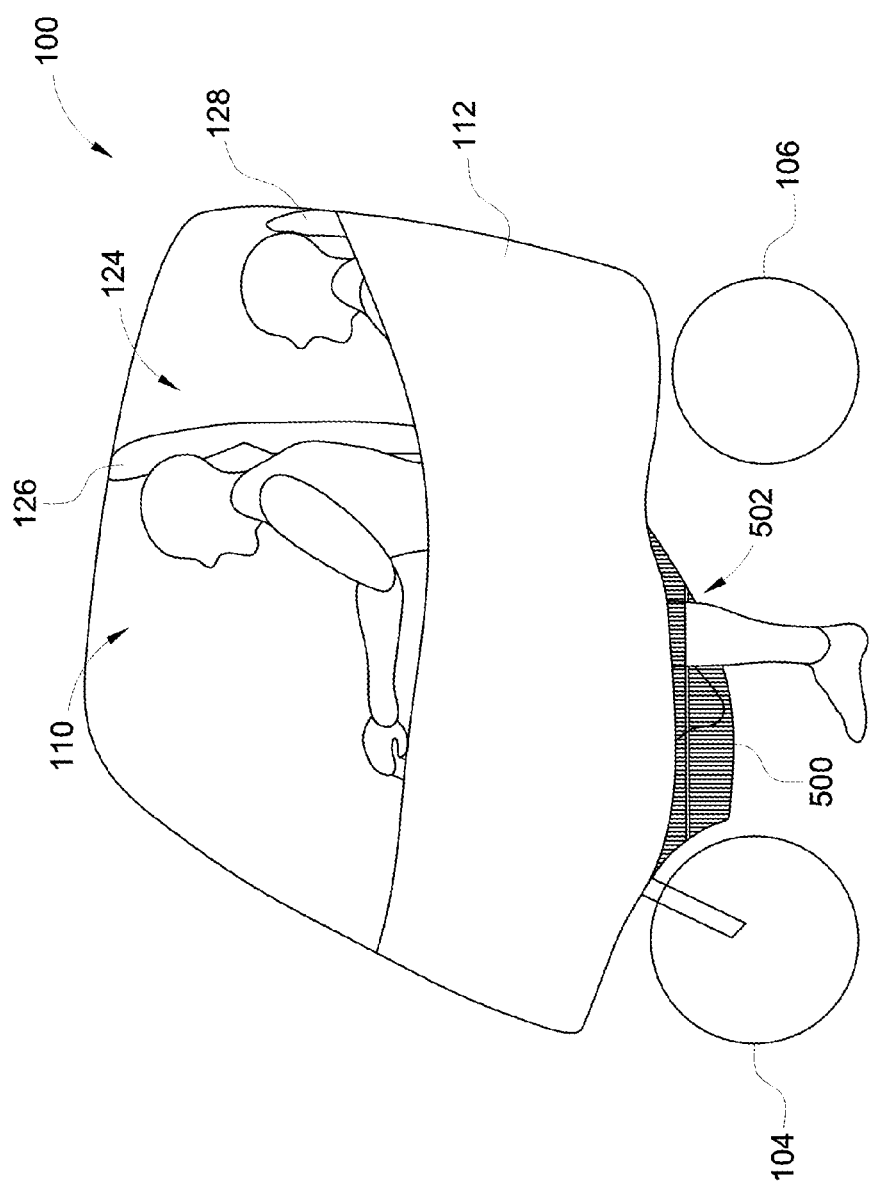

SEATING ARRANGEMENT FOR VEHICLE

CROSS-REFERENCE TO RELATED APPLICATIONS

This application claims priority from United States Provisional Patent Application No. 62/796,079 filed Jan. 23, 2019.

FIELD OF THE DISCLOSURE

The present invention relates to seating arrangements for vehicles, and more specifically, to a seating arrangement that is particularly suitable for installation in a narrow body or a compact vehicle.

BACKGROUND OF THE INVENTION

Many forms of vehicles, from a small vehicle to a large vehicle, have been put to use as passenger vehicles. There has been growing interest in narrow compact vehicles, especially for utilization in urban environments. Such compact vehicles, also known as "ultra-compact vehicles" or "narrow body vehicles," are relatively small and more maneuverable as compared to conventional vehicles. These compact vehicles have an excellent environmental performance, and offer a local, affordable means of transportation. A variety of seating arrangements for such compact vehicles have previously been proposed, however due to the dimensions of the vehicle body, they offer little advantage in terms of mobility and size compared to other vehicles.

Generally, such compact vehicles have a seating arrangement in which the driver seat and the passenger seat are disposed one in front of the other. The design of the seating arrangement is of fundamental importance for the comfort of a means of transport. The comfort of the seats is one of the factors which governs whether a trip is pleasant or tiresome. Compact vehicles tend to suffer from compromised driver ergonomics because of limited cabin space. Due to limited cabin space, usually the front seat and the rear seat are placed close to each other, which leads to reduced leg room for the passenger seated on the rear seat.

U.S. Pat. No. 8,267,456 ('456 patent) discloses a compact seating arrangement for a vehicle. The disclosed seating arrangement comprises three seats: a front driver's seat arranged centrally and, at least to some extent, forward of two transversely aligned rear passenger seats, wherein the driver's seat extends transversely so as to be positioned in front of part of each of the rear passengers' seats, the extent of the overlap in the transverse position of the driver's seat and the rear passenger seats being such that each side of the driver's seat is required to be shaped so as to be able to accommodate at least part of a leg of a passenger seated in a forward facing position in a respective one of the passenger seats.

Still, there remains a continuing need for narrow enclosed vehicles having improved seating arrangements that can be easily maneuvered.

BRIEF SUMMARY OF THE PRESENT INVENTION

The present invention provides a seating arrangement for a vehicle which provides better ergonomics for the occupants such that an occupant of the vehicle seated in at least one rear seat is able to position at least a lower portion of one or both legs thereof comfortably underneath at least one front seat.

In one aspect, the seating the seating arrangement comprises a vehicle, at least one front seat within the vehicle, and at least one rear seat arranged behind the at least one front seat therein. The at least one front seat is rigidly fixed to and suspended from a portion of the vehicle, thereby providing a free space underneath thereof, such that an occupant of the vehicle seated in the at least one rear seat is able to position at least a lower portion of one or both legs thereof in the free space underneath the at least one front seat.

In another aspect there is a seating arrangement for a vehicle. The seating arrangement has at least one front seat, and at least one rear seat arranged behind the at least one front seat therein. The at least one rear seat is installed with a height of the respective seat portion substantially lower as compared to a height of seat portion of the at least one front seat, such that an occupant of the vehicle seated in the at least one rear seat is able to position at least a lower portion of one or both legs thereof in a free space underneath the at least one front seat.

In yet another aspect there is a vehicle. The vehicle has a cabin space having a floor, a roof and side walls. The vehicle also includes a seating arrangement enclosed in the cabin space. The seating arrangement comprises at least one front seat installed in the cabin space. The at least one of the floor of the cabin space and a door is provided with an opening proximal to the at least one front seat to permit a driver of the vehicle, seated on the at least one front seat, to extend a foot from the opening to put the foot on ground. The opening is provided with one or more flexible covering members attached to a periphery of the opening to at least partially cover the opening when the foot is not extended therefrom, and having enough flexibility to permit a foot to pass through the one or more flexible covering members.

Further objects of the invention will be brought out in the following part of the specification, wherein detailed description is for the purpose of fully disclosing the invention without placing any limitations thereon.

BRIEF DESCRIPTION OF THE DRAWINGS

FIG. 3C is a schematic plan view of the cabin space with occupants seated in the seating arrangement of FIG. 3A, in accordance with the second embodiment of the present disclosure;

FIG. 3D is a schematic front view of the seating arrangement of FIG. 3A with occupants seated therein, in accordance with the second embodiment of the present disclosure;

FIG. 5B is a schematic illustration of the vehicle in stop position and a driver putting foot thereof on ground through an opening in floor of the cabin space, in accordance with one or more embodiments of the present disclosure.

DETAILED DESCRIPTION OF EMBODIMENTS

Figure 1A:
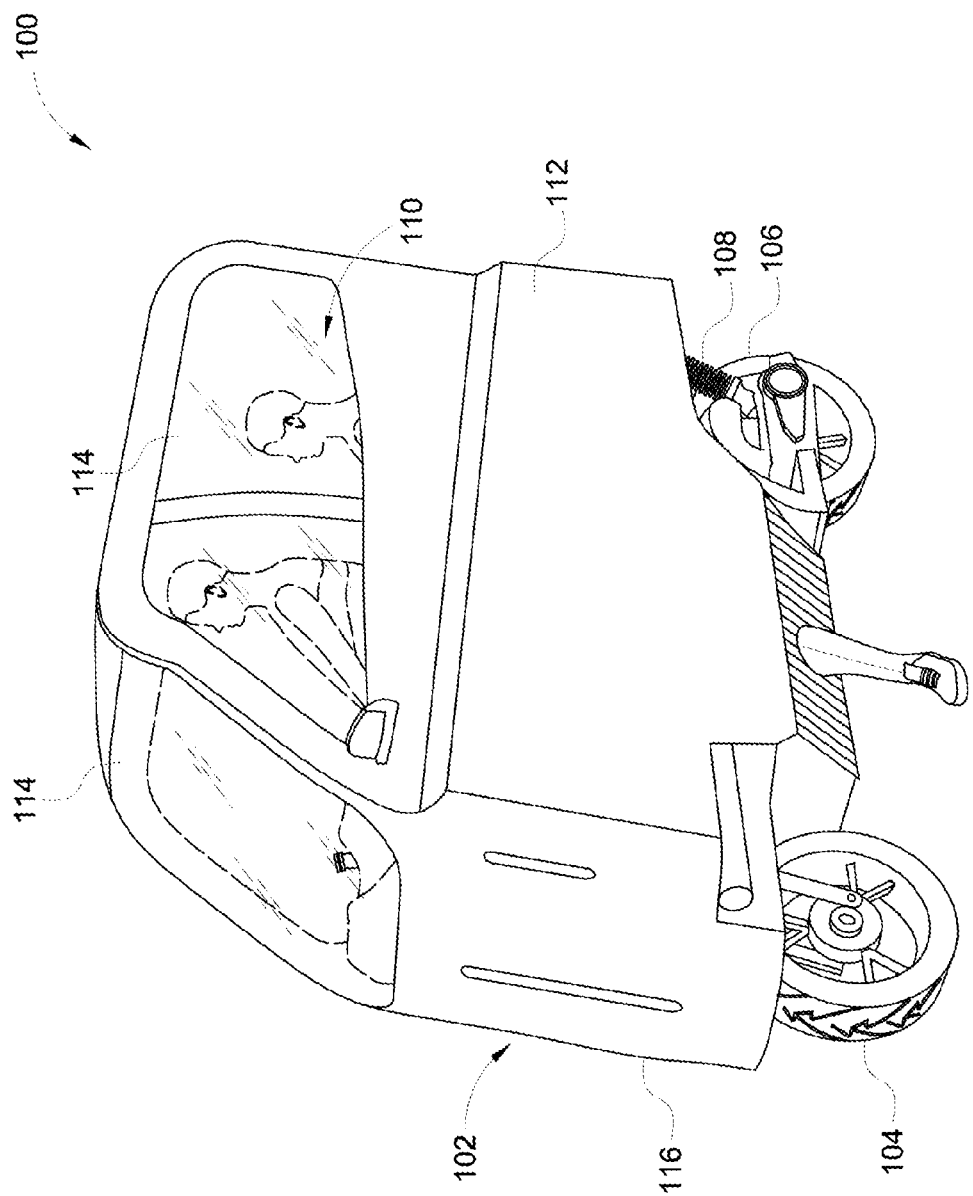
FIG. 1A is a diagrammatic view of a vehicle, in accordance with one or more embodiments of the present disclosure.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, components and/or groups, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein.

Figure 1B:
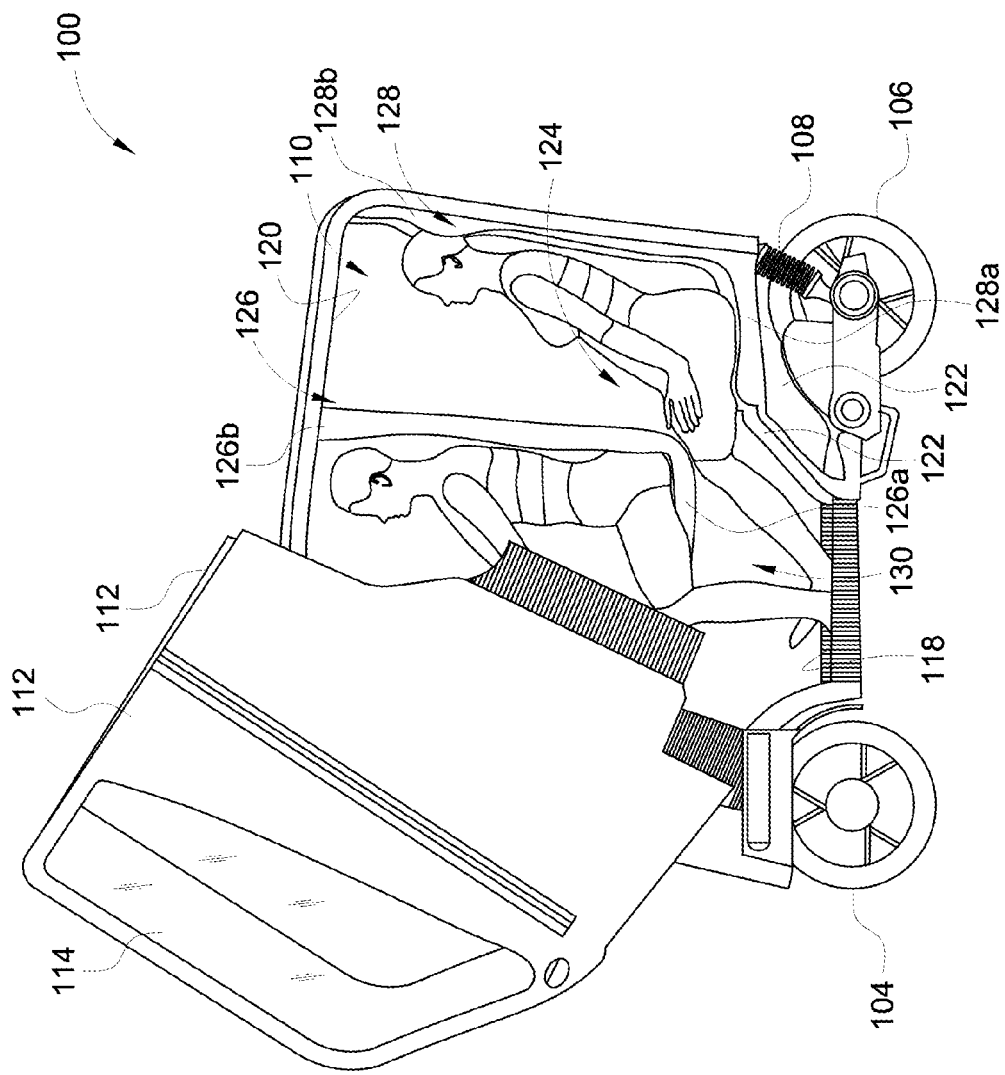
FIG. 1B is a diagrammatic view of the vehicle of FIG. 1A showing cabin space therein, in accordance with one or more embodiments of the present disclosure.

Turning to the Figures, FIGS. 1A-1B are diagrammatic views of a vehicle (generally designated by the numeral 100), in accordance with various embodiments of the present disclosure. The vehicle 100 is an ultra-compact vehicle, also sometimes called narrow body vehicle, as known in the art. The vehicle 100 includes a chassis 102 for providing support to motive power source and occupants therein. The chassis 102 may be formed of sheet material, such as aluminum or steel sheets, corrugated plastic or other suitable material. In the illustrated embodiment, the vehicle 100 is shown as a compact two-wheeler vehicle, with a front wheel 104 and a rear wheel 106. The wheels 104, 106 may be provided with suspension; for instance, as shown, the rear wheel 106 is provided with suspension 108. It will be appreciated that the vehicle 100 may be powered by any known source of motive power including, but not limited to, a combustion engine, an electric motor, or a combination of the same. The source of motive power can be mounted at any convenient location and can drive the vehicle 100 by any suitable form of transmission. It will also be appreciated that, in other examples, the vehicle 100 could have three or four wheels, or even more than four wheels, without departing from the scope of the present disclosure. It may further be contemplated that the vehicle 100 may have numerous other components to support operation thereof which have not been described or depicted herein for the brevity of the present disclosure.

As illustrated, the chassis 102 provides a cabin space 110 to allow seating of occupants of the vehicle 100. As shown, the vehicle 100 includes doors 112 which restricts access to the cabin space 110 and fully enclose the cabin space 110 when in closed position (as depicted in FIG. 1A); for example, to allow for providing air-conditioning inside the vehicle 100. The doors 112 may be provided with windows 114 for aesthetics and comfort of the user. As depicted in FIG. 1A, the cabin space 110 is generally cuboidal in shape with narrow front end wall 116 and rear end wall (not shown); however, the cabin space 110 may have any other suitable compact shape without any limitations. As depicted in FIG. 1B, the cabin space 110 provides a floor 118, a roof 120 and side walls 122. In the illustrated example, the side walls 122 are generally minimal to support the corresponding doors 112 therewith; however, in other examples, the cabin space 110 may have wider side walls, as in conventional vehicles. The end walls (including the front end wall 116), the floor 118, the roof 120 and the side walls 122, along with the doors 112, provide the closed enclosure shape to the cabin space 110 for the occupants of the vehicle 100.

As better illustrated in FIG. 1B, the vehicle 100 includes a seating arrangement 124 provided in the cabin space 110. The seating arrangement 124 of the present disclosure includes at least one front seat 126 and at least one rear seat 128 installed in the cabin space 110. The front seat 126 and the rear seat 128 are arranged in a staggered relationship to one another, with the rear seat 128 arranged behind the front seat 126 therein. That is, the front seat 126 is disposed forward relative to the rear seat 128 in the cabin space 110. In other words, the front seat 126 is mounted closer to a front end of the cabin space 110 relative to the rear seat 128. In the present compact vehicle 100, the front seat 126 and the rear seat 128 are positioned closer together than the front and rear seats of a conventional automobile in order to provide a smaller footprint to the vehicle 100.

As illustrated, each of the front seat 126 and the rear seat 128 includes a seat portion for supporting lower back region and butt area of the occupant seated thereon and a backrest portion to support back region of the occupant seated thereon. For instance, as shown in FIG. 1B, the front seat 126 includes a corresponding seat portion 126a and a backrest portion 126b, and the rear seat 128 includes a corresponding seat portion 128a and a backrest portion 128b. It may be appreciated that the seats 126, 128 may be provided with soft cushioning material for comfort of the occupants seated thereon. In some examples, a foot well (not shown) may be provided in forward area of the cabin space 110 for providing comfortable foot placement of the occupant seated in the front seat 126.

According to embodiments of the present disclosure, the front seat 126 is rigidly fixed to and suspended from one or more of the roof 120 and one of side walls 122 of the cabin space 110 thereby providing free space 130 underneath thereof, such that an occupant of the vehicle 100 seated in the rear seat 128 is able to position at least a lower portion of one or both legs thereof in the free space 130 underneath the front seat 126. According to other embodiments of the present disclosure, the rear seat 128 is installed with a height of the respective seat portion 128a, above the floor 118 of the cabin space 110, substantially lower as compared to a height of seat portion 126a of the front seat 126 thereby providing better utilization of the free space 130 underneath the front seat 126, such that an occupant of the vehicle 100 seated in the rear seat 128 is able to position at least a lower portion of one or both legs thereof in the free space 130 underneath the front seat 126 with comfort. The two embodiments as described above shall be individually implemented or implemented in combined manner without any limitations. In either case, variations of the seating arrangements 124, 200, 300, 400 can be designed as such that the passengers are comfortably seated on the rear seats 128, 304, 306 and the size of the cabin space 110 is kept to a minimum.

Figure 2A:
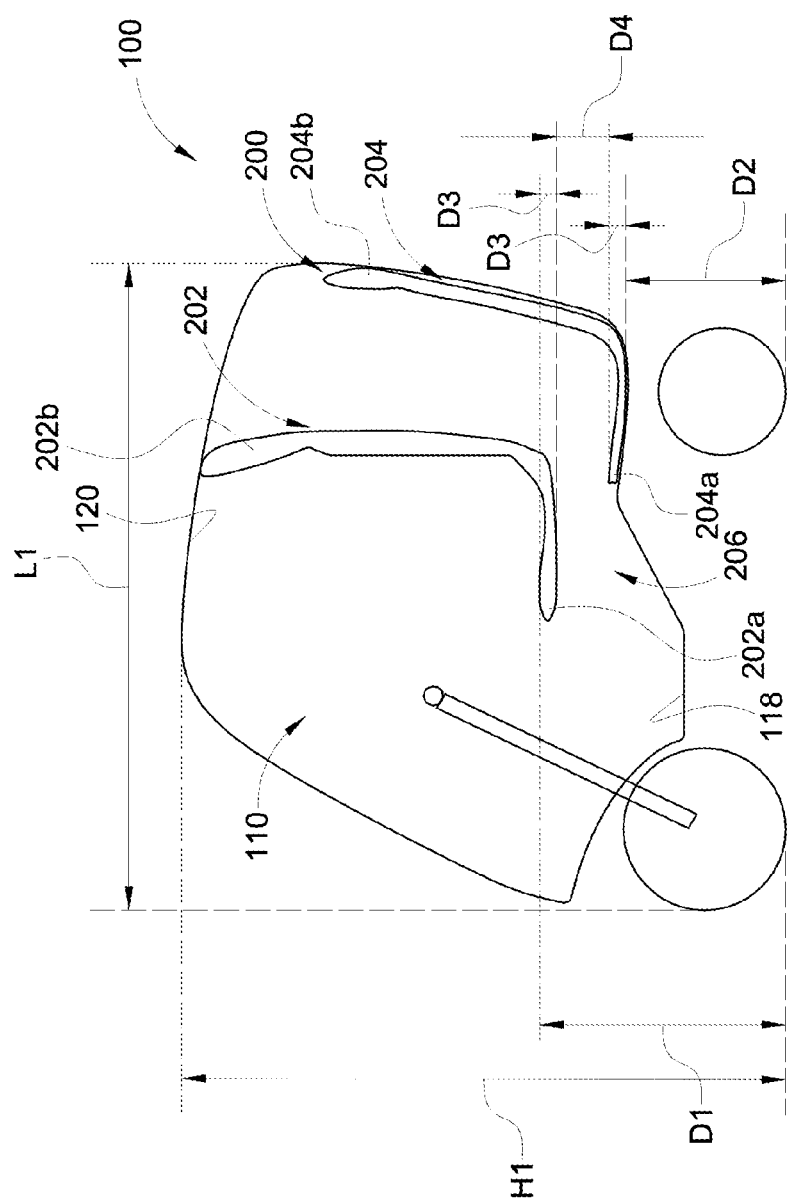
FIG. 2A is a schematic side view of the vehicle with a seating arrangement installed in the cabin space therein, in accordance with a first embodiment of the present disclosure.

FIG. 2A is a schematic side view of the vehicle 100 with a seating arrangement 200 installed in the cabin space 110 therein, in accordance with a first embodiment of the present disclosure. The seating arrangement 200, as illustrated in FIG. 2A, includes one front seat 202 with a seat portion 202a and a backrest portion 202b, and one rear seat 204 with a seat portion 204a and a backrest portion 204b. In this case, the front seat 202 is a seat for a driver of the vehicle 100 and the rear seat 204 is a seat for a passenger of the vehicle 100. In the seating arrangement 200, the front seat 202 and the rear seat 204 are positioned such that the rear seat 204 is directly behind the front seat 202. In some examples, the front seat 202 may be wider or narrower in parts than a conventional automotive seat. The hanging of the front seat 202 and consequently the free space underneath allow the passenger's legs, seated in the rear seat 204, to comfortably extend underneath and/or straddle the front seat 202, as will be discussed in more detail in the proceeding paragraphs.

In the present first embodiment, as shown, the front seat 202 is rigidly fixed to and suspended from the roof 120 of the cabin space 110. In other example, the front seat 202 may be fixed to one or both of the side walls 122 and suspended above the floor 118, of the cabin space 110. In yet other example, the front seat 202 may be fixed to both the roof 120 and the side walls 122 and suspended above the floor 118, of the cabin space 110. It may be appreciated that the rigid fixing to the roof 120 and/or the side wall(s) 122 may be achieved by any suitable attachment means, such as use of extending arms, fasteners, adhesives, or combinations of the same. Since the front seat 202 is suspended above the floor 118, it may be seen that such arrangement leaves free space 206 underneath the front seat 202. Further, the rear seat 204 is installed with a height of respective seat portion 204a substantially lower as compared to a height of the seat portion 202a of the front seat 202, thereby further allowing the passenger to comfortably stretch his/her legs under the front seat 202 in front thereof.

In the present example, as labelled in FIG. 2A, the vehicle 100 has a height 'H1' of about 1700-1800 millimeters above the ground, and a longitudinal length 'L1' of about 1750-2250 millimeters. As shown, the front seat 202 has a height 'D1' of about 740-820 millimeters above the ground. Further, in the present embodiment, as may be seen, the rear seat 204 is installed with a height of the seat portion 204a substantially lower as compared to a height of the seat portion 202a of the front seat 202. As shown, the rear seat 204 has a height 'D2' of about 300-580 millimeters above the ground. Also, as shown, the seat portion 202a of the front seat 202 and the seat portion 204a of the rear seat 204 have thickness 'D3' of about 40-60 millimeters. Since, the rear seat 204 is installed lower as compared to the front seat 202, this further allows the passenger to position his/her leg(s) seated more comfortably under the front seat 302. In the present examples, such arrangement provides the free space 206 with height 'D4' of about 140-250 millimeters. It may be appreciated that such available height of the free space 206 should provide the passenger seated in the rear seat 204 with sufficient space to position at least a lower portion of one or both legs thereof in the free space 206 underneath the front seat 202 with comfort.

Figure 2B:
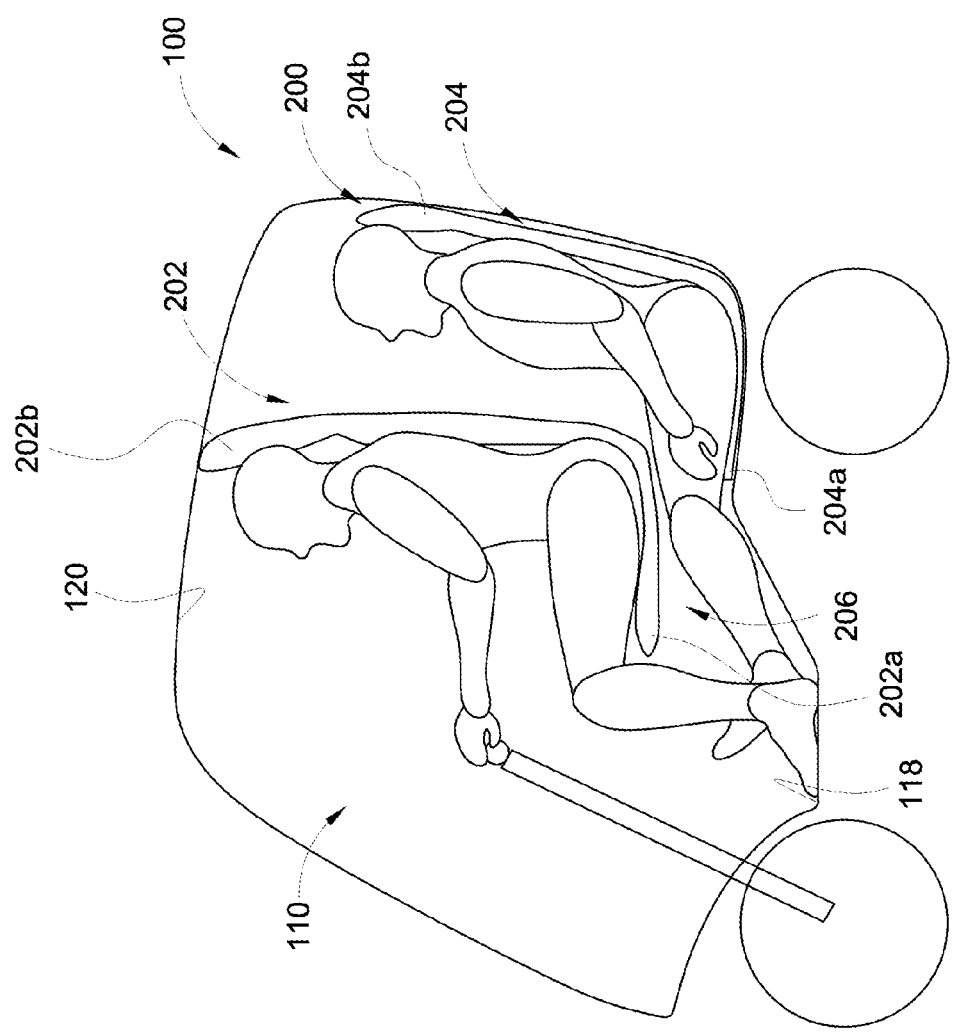
FIG. 2B is a schematic side view of the vehicle with occupants seated in the seating arrangement of FIG. 2A, in accordance with the first embodiment of the present disclosure.
Figure 2C:
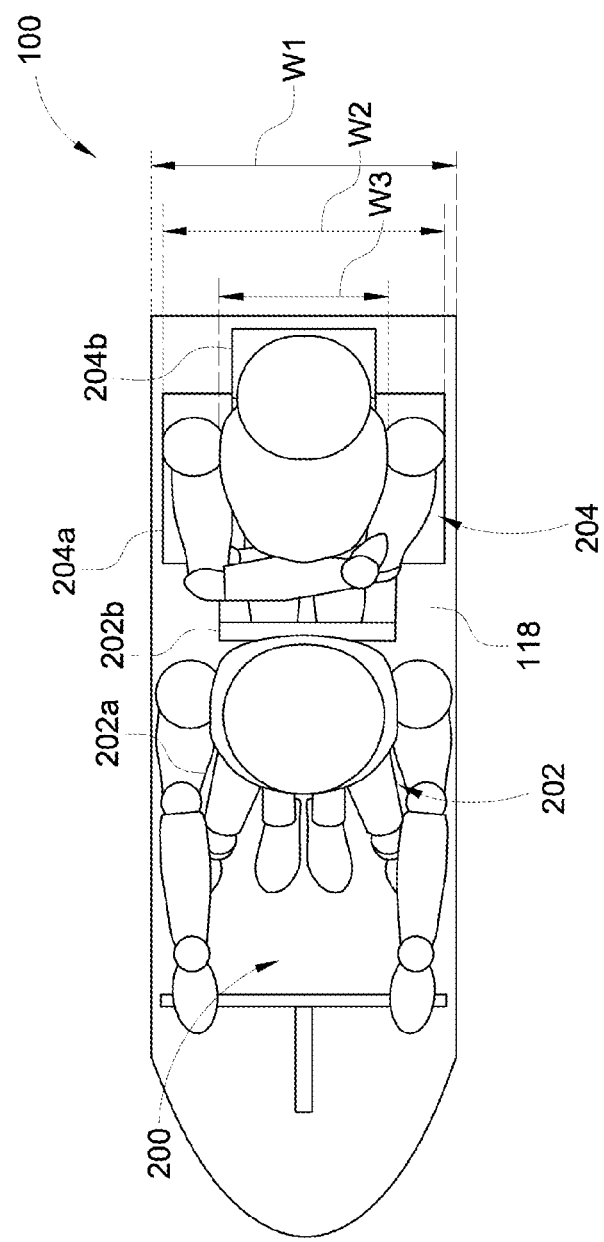
FIG. 2C is a schematic plan view of the cabin space with occupants seated in the seating arrangement of FIG. 2A, in accordance with the first embodiment of the present disclosure.
Figure 2D:
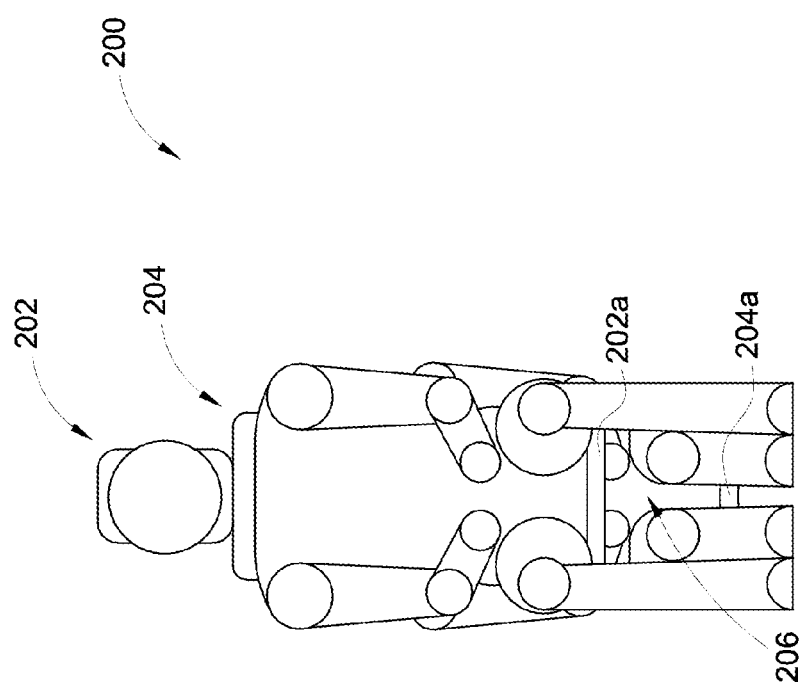
FIG. 2D is a schematic front view of the seating arrangement of FIG. 2A with occupants seated therein, in accordance with the first embodiment of the present disclosure.

FIGS. 2B-2D are depictions of the vehicle 100 of FIG. 2A with the occupants seated in the seating arrangement 200, in accordance with the first embodiment of the present disclosure. It may be understood that the driver of the vehicle 100 will be seated in the front seat 202 and the passenger will be seated in the rear seat 204. As may be seen from FIG. 2B, the passenger of the vehicle 100 is able to position at least a lower portion of both legs thereof in the free space 206 underneath the front seat 202. That is, the passenger of the vehicle 100 would be able to stretch his/her legs comfortably to accommodate in the free space 206 under the front seat 202. This is achieved due to the arrangement of the seating arrangement 200, with the front seat 202 suspended from the roof 120 above the floor 118 of the cabin space 110, and further lowering of the rear seat 204 with respect to the front seat 202 in the cabin space 110. As depicted in FIG. 2C, the passenger is seated right behind the driver in the cabin space 110. In conventional seating arrangement, the passenger may only have some space behind the seat in front thereof, to accommodate his/her legs. However, in the present seating arrangement 200, the passenger can place at least a lower portion of his/her legs behind the front seat 202 and can stretch lower portion of the legs under the front seat 202 in the free space 206 underneath. As depicted and understood by viewing FIGS. 2B and 2D in conjunction, it may be seen that the lower portion of the legs of the passenger seated in the rear seat 204 are comfortably accommodated in between the legs of the driver seated in the front seat 202, in the free space 206 underneath the front seat 202 inside the cabin space 110 of the vehicle 100.

In the present examples, as labelled in FIG. 2C, the vehicle 100 may have a width 'W1' of about 700-900 millimeters. Further, the seat portion 204a of the rear seat 204 may have a width 'W2' of about 500-600 millimeters, and the front seat 202b may have a width 'W3' of about 300-400 millimeters. In one or more examples, the front seat 202 may generally have similar dimensions, including widths of the corresponding seat portion 202a and the backrest portion 204a, as that of the rear seat 204. In some examples, the backrest 204a of the front seat 202 can be made as wide as compared to the rear seat 204, or can be narrower. In a preferred embodiment, the seat portion 202a of the front seat 202 is not as wide at the rear seat 204 so that the driver is able to put his/her foot on the ground. In one embodiment, the driver's seat portion 204a is triangularly shaped (i.e. has narrower front of the seat portion 202a compared to the rear portion of the seat 202a), a design feature used for conventional scooters that have a narrow front portion of the seat).

Figure 3A:
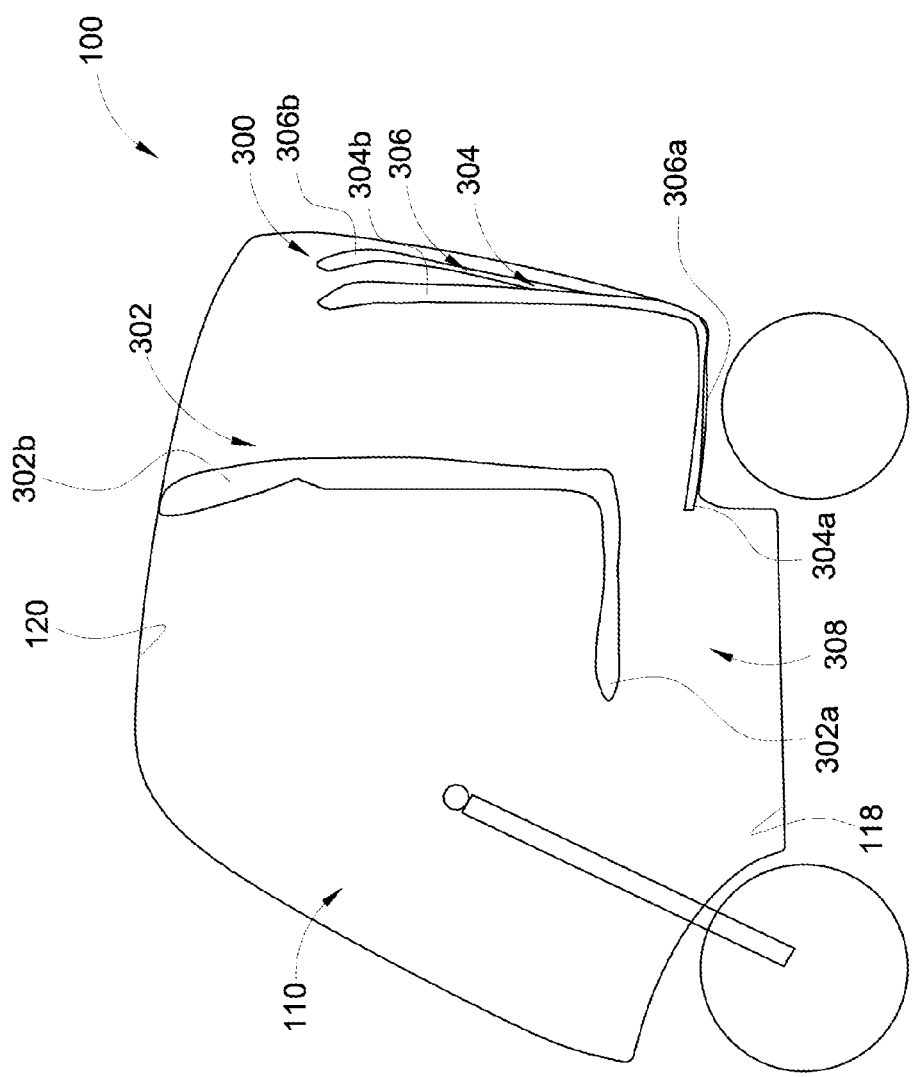
FIG. 3A is a schematic side view of the vehicle with a seating arrangement installed in the cabin space therein, in accordance with a second embodiment of the present disclosure.

FIG. 3A is a schematic side view of the vehicle 100 with a seating arrangement 300 installed in the cabin space 110 therein, in accordance with a second embodiment of the present disclosure. The seating arrangement 300, as illustrated in FIG. 3A, includes one front seat 302 and two rear seats, including a first rear seat 304 and a second rear seat 306. The front seat 302 has a seat portion 302a and a backrest portion 302b, the first rear seat 304 has a seat portion 304a and a backrest portion 304b, and the second rear seat 306 has a seat portion 306a and a backrest portion 306b. In this case, the front seat 302 is a seat for a driver of the vehicle 100, and the two rear seats 304, 306 can accommodate two passengers of the vehicle 100. In the seating arrangement 300, the front seat 302 and the rear seats 304, 306 are positioned such that the front seat 302 is positioned ahead of and substantially along center of the two rear seats 304, 306 installed behind thereof.

As shown in FIG. 3A, in the present second embodiment, the front seat 302 is rigidly fixed to and suspended from the roof 120 of the cabin space 110. In other example, the front seat 302 may be fixed to one or both of the side walls 122 and suspended above the floor 118, of the cabin space 110. In yet other example, the front seat 302 may be fixed to both the roof 120 and the side walls 122 and suspended above the floor 118, of the cabin space 110. Since the front seat 302 is suspended above the floor 118, it may be seen that such arrangement leaves free space 308 underneath the front seat 302. Further, the rear seats 304, 306 are installed with heights of respective seat portions 304a, 306a substantially lower as compared to a height of the seat portion 302a of the front seat 302. Since, the rear seats 304, 306 are installed lower as compared to the front seat 302, this further allows the passengers to position their leg(s) more comfortably under the front seat 302.

Figure 3B:
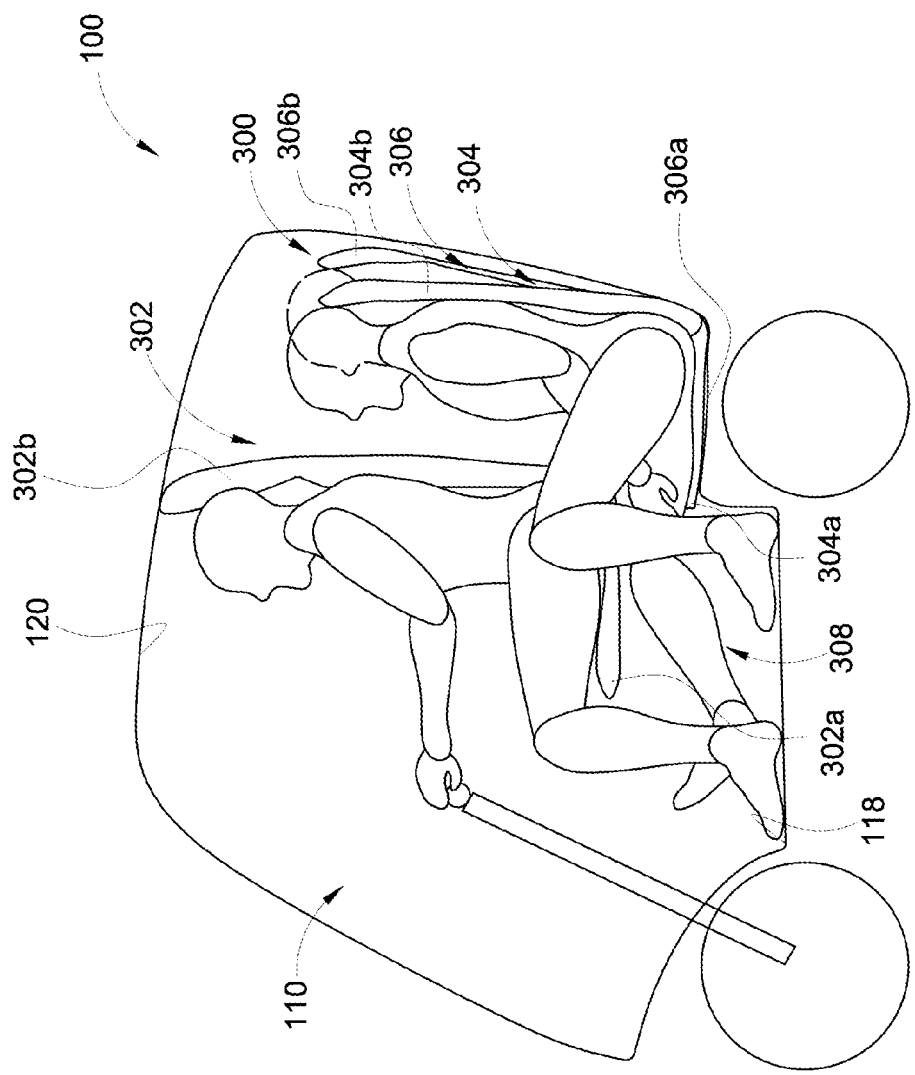
FIG. 3B is a schematic side view of the vehicle with occupants seated in the seating arrangement of FIG. 3A, in accordance with the second embodiment of the present disclosure.

FIGS. 3B-3D are depictions of the vehicle 100 of FIG. 3A with the occupants seated in the seating arrangement 300, in accordance with the second embodiment of the present disclosure. It may be understood that the driver of the vehicle 100 will be seated in the front seat 302 and the passengers will be seated in the rear seats 304, 306. As may be seen, the passengers of the vehicle 100 are able to position at least lower portions of one of their legs each in the free space 308 underneath the front seat 302 and lower portions of their other legs may straddle the front seat 302. That is, one leg of each of the two passengers is located underneath the front seat 302, and the other leg of each of the two passengers remain on the sides of the front seat 302. Herein, it may be contemplated that the right leg of the left passenger and the left leg of the right passenger are located underneath the front seat 302, whereas the left leg of the left passenger and the right leg of the right passenger are located on the left side and right side, respectively, of the front seat 302. This way the passengers of the vehicle 100 would be able to stretch at least one their legs each comfortably to accommodate in the free space 308 under the front seat 302. As discussed above, this is achieved due to the arrangement of the seating arrangement 300 with the front seat 302 suspended from the roof 120 above the floor 118 of the cabin space 110, and further lowering of the rear seats 304, 306 with respect to the front seat 302 in the cabin space 110. As depicted and generally understood by viewing FIGS. 3B and 3D in conjunction, it may be seen that the lower portion of the legs of the passengers seated in the rear seats 304, 306 are comfortably accommodated in between the legs of the driver seated in the front seat 302, in the free space 308 underneath the front seat 302 inside the cabin space 110 of the vehicle 100.

In some examples, the front seat 302 may be made narrower as compared to the rear seats 304, 306, and may be triangularly shaped, having a narrower front portion, such that there is enough space for the driver to put his/her foot on the ground. In the present examples, as labelled in FIG. 3C, the vehicle 100 may have a width 'W4' of about 900-1000 millimeters. The seat portion 302a of the front seat 302 may have a width 'W5' of about 300-400 millimeters. Further, the seat portions 304a, 306b of the rear seats 304, 306 may have a width 'W6' of about 400-450 millimeters. That is, in the present examples, the front seat 302 may generally have slightly smaller width as compared to the rear seats 304, 306. Overall, the seating arrangement 300 is designed as such as to keep the overall size of the cabin space 110, and thereby the vehicle 100 as compact as possible.

Further, as illustrated in FIG. 3A, the seating arrangement 300 having the two rear seats 304, 306 is designed with respective backrest portions 304b, 306b being inclinable. That is, in the present embodiment, the backrest portions 304b, 306b of the two rear seats 304, 306 are configured to be disposed at an angle (i.e. offset) with respect to each other. Such an arrangement allows passengers of the vehicle 100 seated individually in the two rear seats 304, 306 to overlap shoulders thereof (as better depicted in FIG. 3C). This allows the seating arrangement 300 to be installed with the two rear seats 304, 306 placed closer (i.e. side-by-side) in the rear region of the cabin space 110 without causing much discomfort to the rear passengers. Such seating arrangement 300 helps to keep the overall width of the cabin space 110 small, and thereby helps in keeping the overall size of the vehicle 100 compact. In another variations, the seats can be aligned along the same horizontal plane with respect to the cabin space.

Figure 4A:
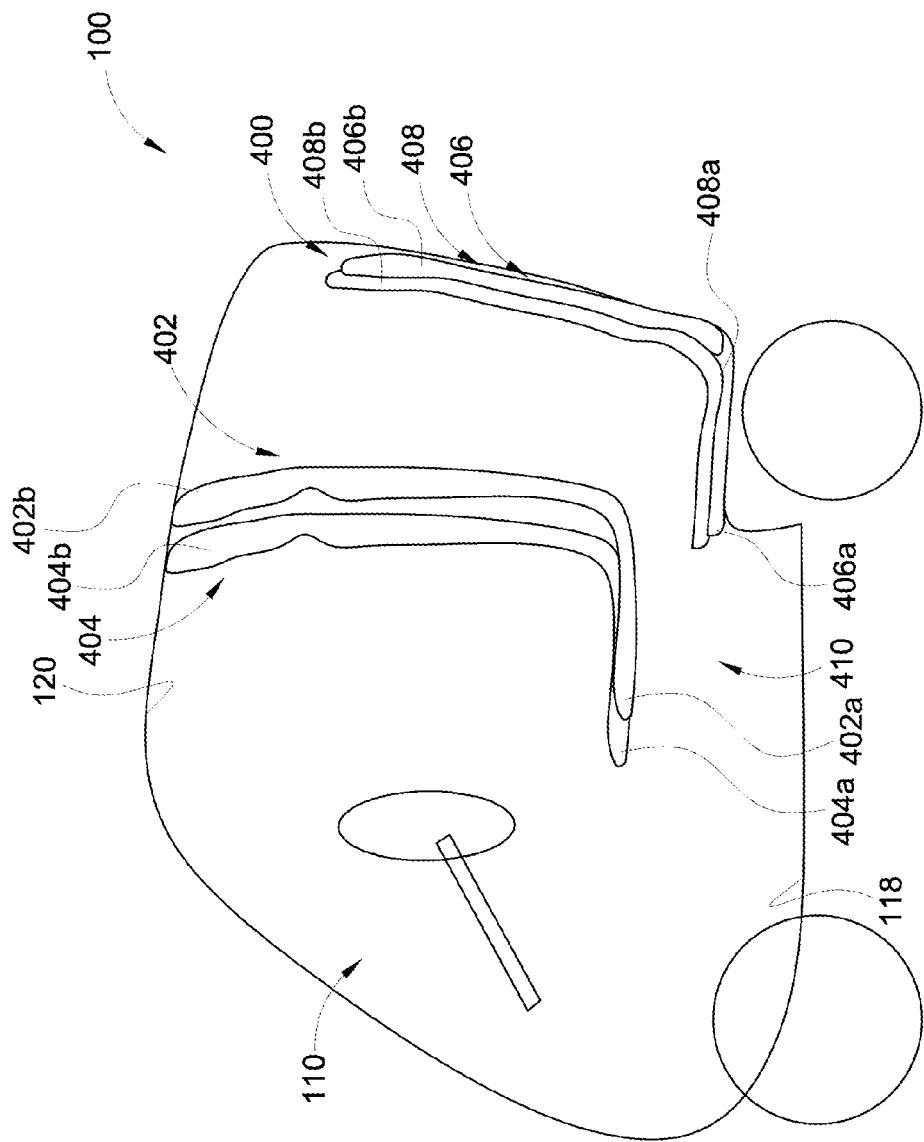
FIG. 4A is a schematic side view of the vehicle with a seating arrangement installed in the cabin space therein, in accordance with a third embodiment of the present disclosure.

FIG. 4A is a schematic side view of the vehicle 100 with a seating arrangement 400 installed in the cabin space 110 therein, in accordance with a third embodiment of the present disclosure. The seating arrangement 400, as illustrated in FIG. 4A, includes two front seats, a first front seat 402 and a second front seat 404; and two rear seats, including a first rear seat 406 and a second rear seat 408. Herein, the first front seat 402 has a seat portion 402a and a backrest portion 402b, the second front seat 404 has a seat portion 404a and a backrest portion 404b, the first rear seat 406 has a seat portion 406a and a backrest portion 406b, and the second rear seat 408 has a seat portion 408a and a backrest portion 408b. In this case, the front seats 402, 404 can accommodate one driver and one passenger of the vehicle 100 therein, and the two rear seats 404, 406 can accommodate two passengers of the vehicle 100 therein. In the seating arrangement 400, the front seats 402, 404 and the rear seats 406, 408 are positioned such that each one of the two front seats 402, 404 is positioned ahead of and aligned with corresponding one of the rear seats 406, 408 behind thereof.

As shown in FIG. 4A, in the present third embodiment, the front seats 402, 404 are rigidly fixed to and suspended from the roof 120 of the cabin space 110. In other example, the front seats 402, 404 may be fixed to one or both of the side walls 122 and suspended above the floor 118, of the cabin space 110. In yet other example, the front seats 402, 404 may be fixed to both the roof 120 and the side walls 122 and suspended above the floor 118, of the cabin space 110. Since the front seats 402, 404 are suspended above the floor 118, it may be seen that such arrangement leaves cumulative free space 410 (as better seen in FIG. 4D) underneath the front seats 402, 404. Further, the rear seats 406, 408 are installed with heights of respective seat portions 406a, 408a substantially lower as compared to heights of the corresponding seat portions 402a, 404a of the front seats 402, 404 in front thereof. Since, the rear seats 406, 408 are installed lower as compared to the front seats 402, 404, this further allows the passengers to better utilize the available free space 410 underneath the front seats 402, 404 and position their leg(s) more comfortably under the front seats 402, 404.

Figure 4B:
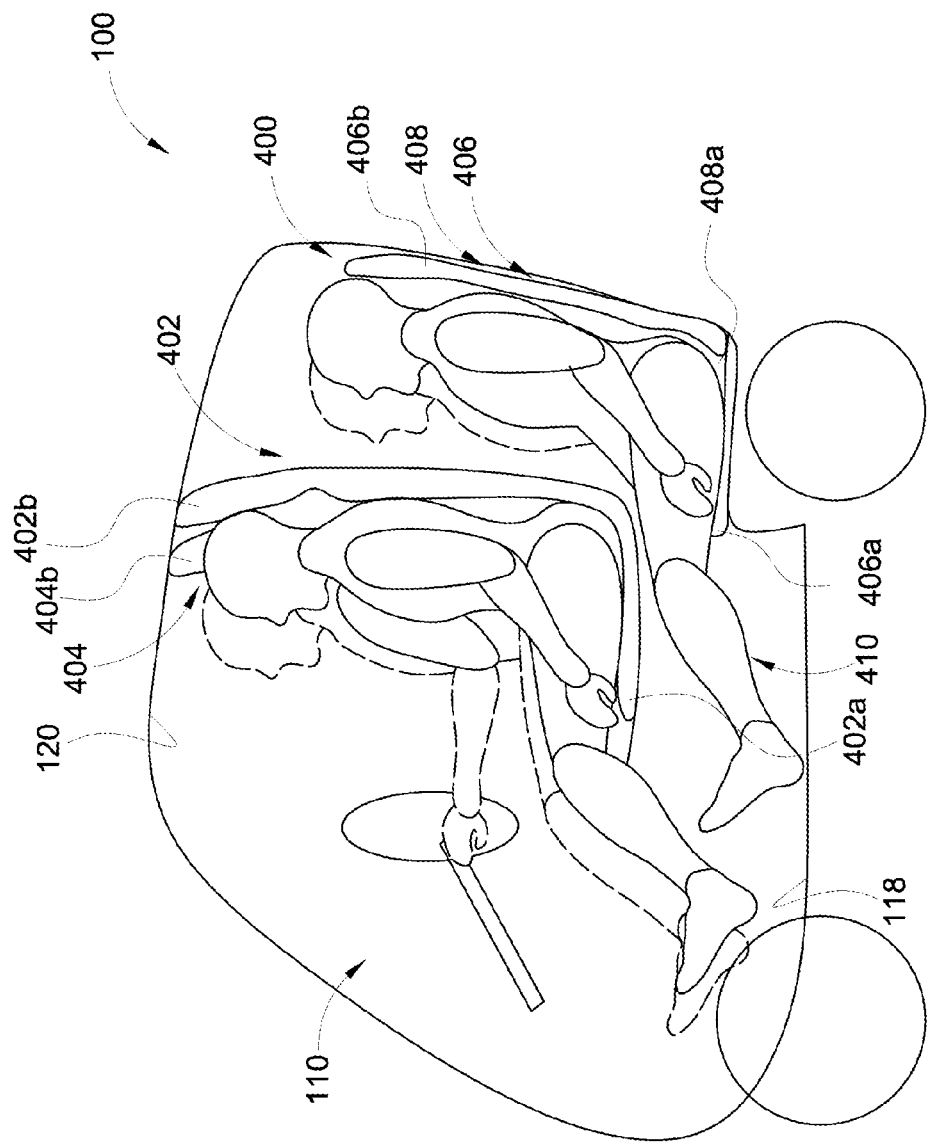
FIG. 4B is a schematic side view of the vehicle with occupants seated in the seating arrangement of FIG. 4A, in accordance with the third embodiment of the present disclosure.
Figure 4C:
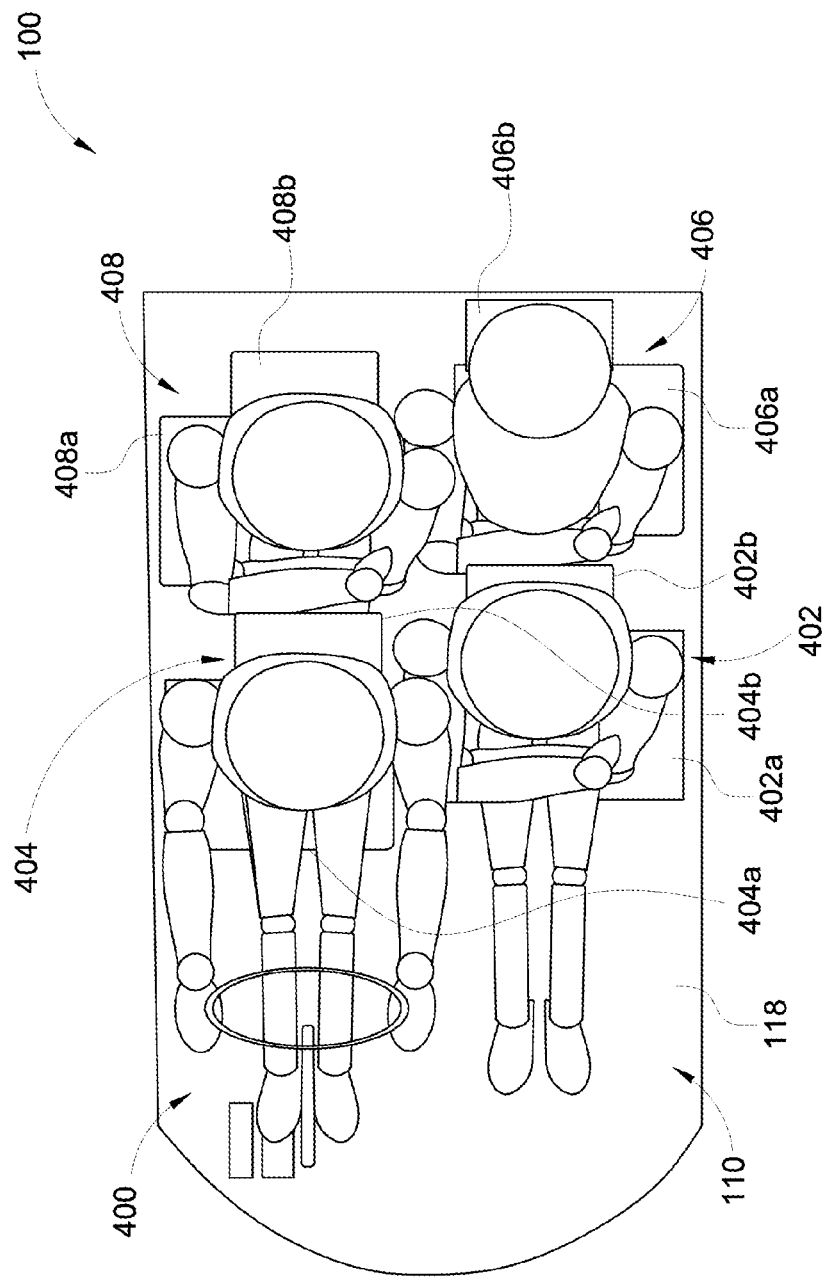
FIG. 4C is a schematic plan view of the cabin space with occupants seated in the seating arrangement of FIG. 4A, in accordance with the third embodiment of the present disclosure.
Figure 4D:
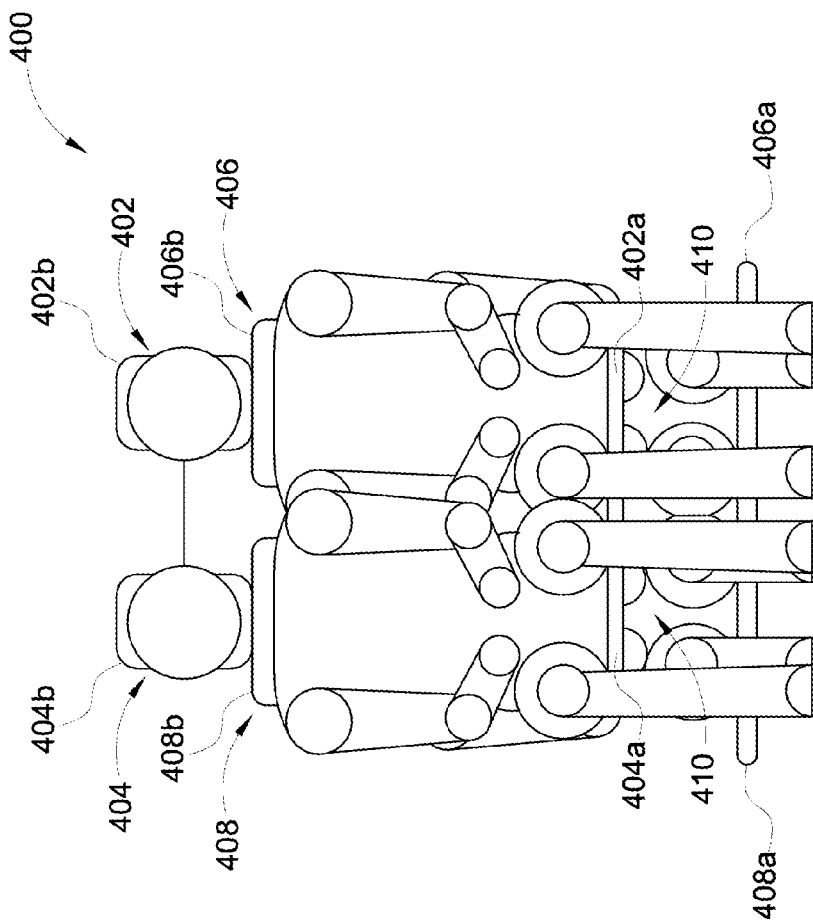
FIG. 4D is a schematic front view of the seating arrangement of FIG. 4A with occupants seated therein, in accordance with the third embodiment of the present disclosure.

FIGS. 4B-4D are depictions of the vehicle 100 of FIG. 4A with the occupants seated in the seating arrangement 400, in accordance with the third embodiment of the present disclosure. It may be understood that the driver of the vehicle 100 will be seated in one of the front seats 402, 404 and one passenger may be seated in other of the front seats 402, 404, and two more passengers may be seated in the rear seats 406, 408. As may be seen, the passengers seated in the rear seats 406, 408 of the vehicle 100 are able to position at least lower portions of their legs in the free space 410 underneath the front seats 402, 404. This way the rear passengers of the vehicle 100 would be able to stretch their legs comfortably to accommodate in the free space 410 under the front seats 402, 404. This is achieved due to the arrangement of the seating arrangement 400 with the front seats 402, 404 suspended from the roof 120 above the floor 118 of the cabin space 110, and further lowering of the rear seats 406, 408 with respect to the front seats 402, 404 in the cabin space 110. As depicted and generally understood by viewing FIGS. 4B and 4D in conjunction, it may be seen that the lower portion of the legs of the passengers seated in the rear seats 406, 408 are comfortably accommodated in between the legs of front passengers, in the free space 410 underneath the front seats 402, 404 inside the cabin space 110 of the vehicle 100.

Further, as illustrated in FIG. 4A, the seating arrangement 400 is designed such that the backrest portions 406b, 408b of the two rear seats 406, 408 are inclinable. That is, in the present embodiment, the backrest portions 406b, 408b of the two rear seats 406, 408 are configured to be disposed at an angle with respect to corresponding seat installed to side thereof. Such an arrangement allows passengers of the vehicle 100 seated individually in the two front seats 402, 404 and the two rear seats 406, 408 to overlap shoulders thereof (as better depicted in FIG. 4C) with other passenger seated next in the seat to the side thereof. This allows the seating arrangement 400 to be installed with the two front seats 402, 404 and the two rear seats 404, 406, respectively, placed closer (i.e. side-by-side) in the front and rear regions of the cabin space 110 without causing much discomfort to the occupants. Also, as illustrated, the front passenger seat 404 is offset from the driver's seat 402 so that the shoulders of the front passenger are overlapping one of the shoulders of the driver. Such seating arrangement 400 helps to keep the overall width of the cabin space 110 small, and thereby helps in keeping the overall size of the vehicle 100 compact.

As best illustrated in FIG. 4C, the two rear seats 406, 408 are in line with the corresponding two front seats 402, 404 such that each of the occupants of the vehicle seated individually in the rear two seats 406, 408 is able to position at least a lower portion of one or both legs thereof in the free space underneath the respective front seat 402, 404 from the two front seats 402, 404, arranged in line therewith. In other embodiments, only one rear seat 406 may be in line with one front seat 402.

Figure 5A:
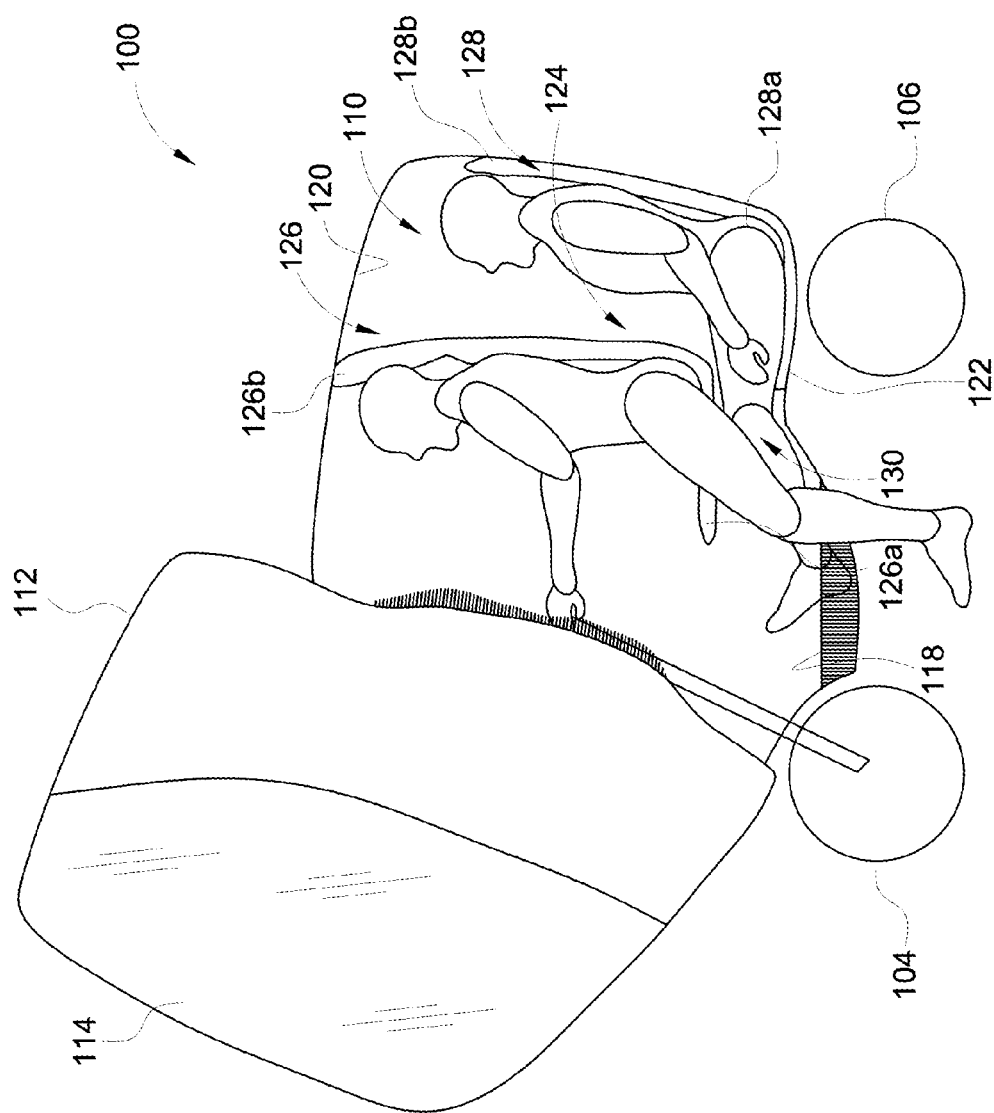
FIG. 5A is a schematic illustration of the vehicle in stop position and a driver putting foot thereof on ground with doors opened, in accordance with one or more embodiments of the present disclosure.

FIG. 5A is a schematic side view of the vehicle 100 of FIGS. 1A-1B, in accordance with one or more embodiments of the present disclosure. Herein, the seating arrangement 124 may be any one of the disclosed seating arrangements 200 or 300 in the preceding paragraphs. The seating arrangement 124 is installed in the cabin space 110 to allow the driver of the vehicle 100 to put foot down in case the vehicle 100 is at a stop, so as to allow the driver to balance the vehicle 100 and prevent falling thereof. In the illustrated example of FIG. 5A, the driver may put down foot on ground by extending foot out of the cabin space 110, when the doors 112 are opened.

FIG. 5B is a schematic side view of the vehicle 100 of FIGS. 1A-1B, in accordance with another embodiment of the present disclosure. Herein, the seating arrangement 124 may be any one of the disclosed seating arrangements 200 or 300 in the preceding paragraphs. Herein, the floor 118 of the vehicle 100 may be provided with an opening 502 such that the driver may put down foot on ground by extending foot out through the opening 502 in the cabin space 110, even when the corresponding side door 112 is closed. In other examples, as illustrated in FIG. 5B, one of the doors 112 next to the driver's seat may be provided with the said opening 502, where the opening is a space between at least one of the doors 112 and floor 118. This allows the driver of the vehicle 100 to put foot down in case the vehicle 100 is at a stop without the requiring the doors 112 being opened, so as to allow the driver to balance the vehicle 100 and prevent falling thereof. In some examples, the opening 502 may be provided on both sides of the front seat on which the driver is seated, to allow the driver to use either of left or right foot thereof, as desired. In the illustrated example of FIG. 5B, the opening 502 is provided with one or more flexible covering members 500 to cover the opening 502. The flexible covering members 500 may keep the opening 502 closed when the foot is not extended therefrom, so as to prevent unwanted dust and particles to enter the cabin space 110 from the ground when the vehicle 100 is travelling. In the present examples, the flexible covering members 500 may include bristles attached to periphery of the opening 502 in the floor 118 in the cabin space 110 of the vehicle 100 and/or the door 112.

The embodiments provide for several advantages over the prior art. The seating arrangement (such as, the seating arrangement 124) of the present disclosure provides comfort to the passenger(s) seated in the rear seat(s) 128 in the cabin space 110 of the vehicle 100. With the seating arrangement 124, at least one of the legs of the passenger(s) seated in the rear seat(s) 128 is comfortably located underneath instead of around or behind the front seat(s) 126. Herein, the feet of the passenger(s) seated in the rear seat(s) 128 are positioned in between the feet of the driver seated in the front seat(s) 126. The seating arrangement 124 is designed as such that the passenger(s) are comfortably seated on the rear seat(s) 128 and the size of the cabin space 110 is kept to a minimum, and thus helps to keep the overall footprint of the vehicle small. Herein, it may be appreciated that the seating arrangement 124 can also be implemented in driverless or autonomous vehicles for comfort of the occupants of such vehicles.

The vehicle 100 with the seating arrangement 124 proposed in this invention will occupy less space and therefore, will permit richer and more versatile movements in congested roads. The driver will have an easier estimate of road space on overtaking maneuvers. Such vehicle would make possible to lane split, and easier to get through traffic, and will reduce the length of trips and ease traffic congestion. Further, parking will also be easier than with other narrow body vehicles. It may be appreciated that although the presently disclosed embodiments have been described in terms of the vehicle 100 being the ultra-compact vehicle, the disclosed embodiments may also be applied to other types of compact vehicles, like passenger cars, etc. for providing better sitting ergonomics. In other examples, the seating arrangement 124 of the present disclosure may be implemented in other transportation mediums, like planes, trains, etc. In yet other examples, the seating arrangement 124 of the present disclosure may be implemented in public spaces, like theatres, auditoriums, etc., wherever rows of seats are needed to be installed, without any limitations.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A seating arrangement, the seating arrangement comprising:
   a) a vehicle;
   b) at least one front seat within the vehicle; and,
   c) at least one rear seat arranged behind the at least one front seat therein,
   wherein the at least one front seat is rigidly fixed to and suspended from a portion of the vehicle, wherein the portion of the vehicle is a roof, and wherein the at least one front seat is only rigidly fixed to and suspended from the roof, thereby providing a free space underneath thereof, such that an occupant of the vehicle seated in the at least one rear seat is able to position at least a lower portion of one or both legs thereof in the free space underneath the at least one front seat; and,
   wherein the at least one rear seat is installed with a height of a respective seat portion, substantially lower as compared to a height of a seat portion of the at least one front seat, and wherein at least a portion of the at least one rear seat overlaps with at least a portion of the at least one front seat.

* * * * *